US012784349B2

(12) United States Patent
Hui et al.

(10) Patent No.: US 12,784,349 B2
(45) Date of Patent: Nov. 3, 2026

(54) GENERATING AND EMPLOYING COMPUTER VISION MODELS OF A STRUCTURAL ENVIRONMENT

(71) Applicant: PepsiCo, Inc., Purchase, NY (US)

(72) Inventors: Jingting Hui, Plano, TX (US); Tsz-Ching Yuan, Valhalla, NY (US); Nien-Han Tan, Chicago, IL (US); Greg Bellon, Plano, TX (US)

(73) Assignee: PepsiCo, Inc., Purchase, NY (US)

( * ) Notice: Subject to any disclaimer, the term of this patent is extended or adjusted under 35 U.S.C. 154(b) by 168 days.

(21) Appl. No.: 18/933,757

(22) Filed: Oct. 31, 2024

(65) Prior Publication Data

US 2026/0120397 A1 Apr. 30, 2026

(51) Int. Cl.

| | |
|---|---|
| ***G06T 17/00*** | (2006.01) |
| ***G06T 3/40*** | (2024.01) |
| ***G06T 7/20*** | (2017.01) |
| ***G06T 13/40*** | (2011.01) |
| ***G06V 10/44*** | (2022.01) |
| ***H04N 21/81*** | (2011.01) |

(52) U.S. Cl.

CPC ................ *G06T 17/00* (2013.01); *G06T 3/40* (2013.01); *G06T 7/20* (2013.01); *G06T 13/40* (2013.01); *G06V 10/44* (2022.01); *H04N 21/816* (2013.01); *G06V 2201/07* (2022.01)

(58) Field of Classification Search

CPC .. G06T 17/00; G06T 3/40; G06T 7/20; G06T 13/40; G06V 10/44; G06V 2201/07; G06V 2201/10; G06V 10/774; G06V 20/52; H04N 21/816; H04N 7/183; B25J 1/00; G06F 18/00

USPC ........................................................ 345/419

See application file for complete search history.

(56) References Cited

U.S. PATENT DOCUMENTS

2020/0304375 A1 9/2020 Chennai et al.
2021/0227191 A1* 7/2021 Babu J D ............ H04N 13/128
2021/0304420 A1* 9/2021 Krunic ...................... G06T 7/12
2021/0374659 A1 12/2021 Ganapathi et al.
2022/0083976 A1 3/2022 Rakshit et al.
2023/0267400 A1 8/2023 Nicotera et al.

(Continued)

*Primary Examiner* — James A Thompson
*Assistant Examiner* — Kim Thanh T Tran
(74) *Attorney, Agent, or Firm* — Barnes & Thornburg LLP; Noel Gordanier

(57) ABSTRACT

Disclosed are techniques for generating and employing computer vision models of a structural environment. Real video is received of physical actions being performed in a physical space within the structural environment. A virtual replica of the physical space and objects within the physical space are generated, based on environment data corresponding to the physical space. Synthetic video that represents virtual actions being performed is generated using the virtual replica. A computer vision model of the structural environment is trained, based on the real video and the synthetic video. A real video stream of subsequent actions being performed in the physical space is received. Perception metadata that represents the subsequent actions being performed is generated, by providing the real video stream to a perception pipeline that uses the computer vision model of the structural environment. The perception metadata is aggregated, and a corresponding visualization is generated.

20 Claims, 10 Drawing Sheets

(56) References Cited

U.S. PATENT DOCUMENTS

| | | | |
|---|---|---|---|
| 2023/0289677 | A1 | 9/2023 | Otsuki et al. |
| 2023/0359778 | A1 | 11/2023 | Brett et al. |

* cited by examiner

610

620

630

GENERATING AND EMPLOYING COMPUTER VISION MODELS OF A STRUCTURAL ENVIRONMENT

TECHNICAL FIELD

This document generally describes technology related to generating computer vision models of a structural environment, using the computer vision models to identify objects and/or actions in the structural environment, and aggregating perception metadata that represents the objects and/or actions to generate corresponding visualizations.

BACKGROUND

Computer vision techniques may use artificial intelligence (AI) and machine learning (ML) to train computer vision models to recognize object in images and video. The training of computer vision models may be based on large amounts of visual data, such as visual data collected by cameras operating in a physical environment. Computer vision applications based on the models may be used to perform a variety of tasks, such as object identification.

SUMMARY

The following describes technology for generating and employing computer vision models of a structural environment (e.g., a manufacturing facility, a warehouse facility or another sort of physical environment in which objects are fabricated, manipulated, and/or transported by various actors, such as human, mechanical, and/or robotic workers). The computer vision models may be used to identify objects that are present in the environment and/or actions that are performed in the environment, and perception metadata that represents the objects and actions may be aggregated for the real-time (or near real-time) generation of corresponding visualizations. To generate the computer vision models, real video data of the structural environment may be collected by various imaging devices (e.g., video cameras), and provided for model training. Further, synthetic video data that represents virtual actions being performed in a virtual replica of the structural environment may be generated through simulation techniques, and provided for refining the computer vision models. The synthetic video data may be automatically labeled, and may represent a variety of camera angles, objects, and actions that may or may not exist in the real video data. The refined computer vision models may be used to identify objects and actions in a real video stream of the structural environment, based on the application of a perception pipeline. The application of the perception pipeline generates perception metadata that corresponds to identified objects and/or actions in the real video stream, according to a defined structural format. The perception metadata may be used to generate various visualizations (e.g., through one or more dashboard applications), which may in turn be used to generate insights into the impact of the actions being performed in the structural environment.

In general, based on the generated insights, various optimizations (e.g., physical and/or process optimizations) may be implemented through a reconfiguration of the structural environment. For example, resources within the structural environment (e.g., workers and/or equipment) may be reallocated, space within the structural environment may be rearranged (e.g., by moving fixtures, equipment, etc.), equipment may be serviced, and so forth. After reconfiguring the structural environment, for example, the computer vision models may be retrained, further insights may be generated, and further optimizations may be implemented, through a cycle of continuous improvement.

One or more embodiments described herein may include a method for generating and employing computer vision models of a structural environment, including receiving real video of physical actions being performed in a physical space within the structural environment; receiving environment data that defines (i) physical dimensions of the physical space, and (ii) physical dimensions and operational characteristics of objects within the physical space; generating a virtual replica of the physical space and the objects within the physical space, based on the environment data; generating synthetic video that represents virtual actions being performed, using the virtual replica; training a computer vision model of the structural environment, based on the real video and the synthetic video; receiving a real video stream of subsequent actions being performed in the physical space within the structural environment; generating perception metadata that represents the subsequent actions being performed, by providing the real video stream to a perception pipeline that uses the computer vision model of the structural environment; aggregating at least a portion of the perception metadata; and generating a visualization of the aggregated perception metadata.

Other embodiments of this aspect may include corresponding computer systems, and may include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions.

These and other embodiments may include any, all, or none of the following features. The real video and the real video stream may be received from real video cameras located in the structural environment. The objects within the physical space may include actors that perform interactions with fixed or movable objects. Generating the synthetic video may include performing a computer simulation of the interactions with the fixed or movable objects performed by the actors. Generating the synthetic video may include capturing the synthetic video from a perspective of a virtual camera that is directed towards the virtual replica and the virtual actions being performed. The perspective of the virtual camera may be from a virtual camera angle that corresponds to a real camera angle of a real video camera that captures the real video of physical actions being performed in the physical space. The perspective of the virtual camera may be from a virtual camera angle that does not correspond to a real camera angle of a real video camera that captures the real video of physical actions being performed in the physical space. The synthetic video may be automatically annotated with identifiers of at least some of the objects. The perception pipeline may includes sequentially performed operations for processing the real video stream, the operations including at least one of (i) a decoding operation, (ii) a scaling operation, (iii) an object detection operation, (iv) an object tracking operation, (v) an object cropping operation, and (vi) a feature extraction operation. Generating the perception metadata may include identifying a plurality of objects represented in a video frame of the real video stream. The perception metadata may include, for each object of the plurality of objects represented in the video frame of the real video stream, at least one of (i) an object identifier, (ii) a timestamp, and (iii) feature embeddings that result from a feature extraction operation performed on the object. The perception metadata may be maintained by a real-time data service. Aggregating at least a portion of the perception metadata may include accessing the perception metadata from the real-time data service. The visualization of the aggregated perception metadata may be provided for presentation by a dashboard application executed by a client computing device. Aggregating at least a portion of the perception metadata may include identifying the portion of the perception metadata that pertains to a specified period of time and counting instances of a defined action that are represented in the portion of the perception metadata over the specified period of time. Based on the visualization of the aggregated perception metadata, a reconfiguration of the structural environment may be performed.

The devices, system, and techniques described herein may provide one or more of the following advantages. Synthetic video data may be generated and used for enhancing and/or refining a preliminary model that has been initially trained using real video data. The synthetic video data may be captured from a variety of different camera angles, and may include a variety of different simulated actions, to replicate images that may rarely occur in the real video data (e.g., including various occlusion and lighting scenarios), thus providing a more robust set of training data for generating a computer vision model of a structural environment. Further, use of the synthetic video data may promote data transparency and audit trails, and may expedite data labeling processes (which may otherwise be a significant bottleneck in training computer vision models). The impact of different camera angles on computer vision model accuracy may be efficiently explored in a virtual space, and results of the exploration may be advantageously applied to configure a physical camera in a physical space. A perception pipeline may include linked operations for processing video streams, thereby improving the efficiency of downstream operations that aggregate perception metadata resulting from the perception pipeline. Optimizations of a structural environment and/or optimizations of processes performed within the structural environment may be achieved, based on an analysis of generated visualizations of perception metadata.

The disclosed technology provides a technical solution to a technical problem related to efficiently generating and/or employing computer vision models that may accurately identify objects and/or actions in a structural environment. To address the technical problem, automatically labeled synthetic video data may be generated and used to supplement real video data for robust and efficient training of the computer vision models, under a variety of different scenarios that may or may not occur in the real video data. To further address the technical problem, a perception pipeline may include a defined sequence of linked operations that are configured to efficiently employ the generated computer vision models when detecting instances of objects and/or actions in the structural environment. To further address the technical problem, the resulting metadata may be delivered in a structural format that may be readily aggregated through a variety of different visualizations in real-time (or near real-time).

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

This document generally relates to technology for generating and employing computer vision models of a structural environment. In general, model training may be performed on real video data of the structural environment and on synthetic video data of a virtual replica of the structural environment. Once the computer vision models have been trained, the models may be used to identify objects that are present in the environment and/or to identify actions that are performed in the environment. Perception metadata that represents the objects and actions may be generated and/or aggregated for the real-time (or near real-time) generation of corresponding visualizations (e.g., through a dashboard application).

Figure 1:
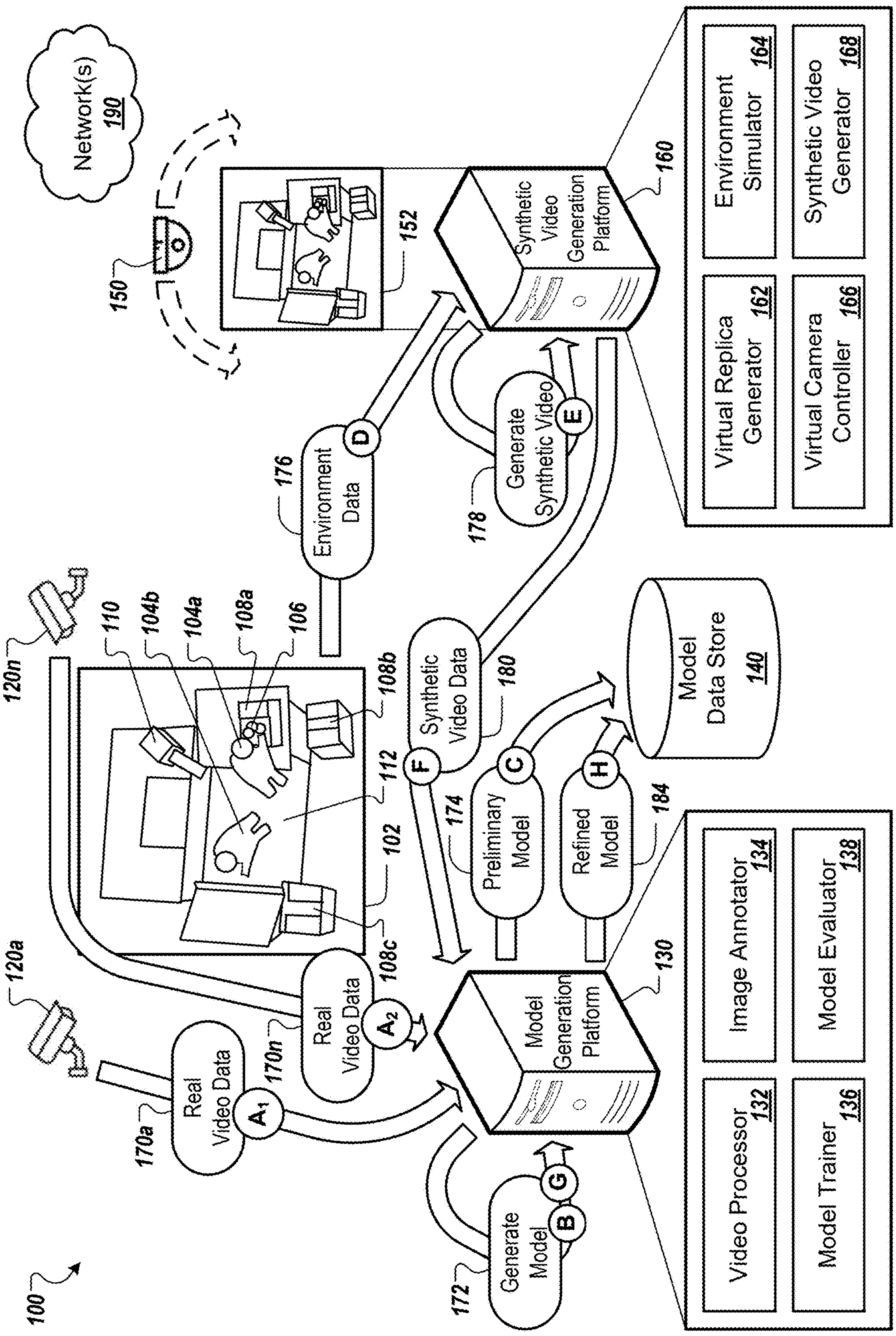
FIG. 1 is a conceptual diagram of an example system and an example process for generating computer vision models of a structural environment.

FIG. 1 is a conceptual diagram of an example system 100 and an example process (represented in stages (A) to (H)) for generating computer vision models of a structural environment (e.g., a warehouse facility, a manufacturing facility, a retail location, a sports arena, or another sort of structural environment) at which various activities may occur. In general, the system 100 may include various data collection devices, computing devices, computing server systems, and data stores, configured to communicate with each other over one or more networks. For example, the system 100 may include one or more imaging devices 120*a-n*, a model generation platform 130, a model data store 140, and a synthetic video generation platform 160, that may communicate and exchange data over network(s) 190 (e.g., including one or more LANs (local area networks), WANs (wide area networks), and/or the Internet).

The imaging devices 120*a-n* (e.g., digital video cameras or other suitable types of imaging devices), for example, may be capable of capturing moving images of actions that occur in an environment 102 (e.g., an indoor and/or outdoor physical space, such as an interior and/or exterior of a structural environment). The imaging devices 120*a-n*, for example, may be fixed or mobile, and may transmit a stream of video data that corresponds to the captured moving images. For example, the stream of video data may be transmitted by the imaging devices 120*a-n* to the model generation platform 130 over the network(s) 190, for further processing.

The model generation platform 130, for example, may be implemented across one or more servers, including but not limited to network servers, web servers, application servers, or other suitable computing servers. In general, the model generation platform 130 may access real and/or synthetic video data that represents actions being performed within the environment 102, and/or may generate one or more computer vision models of the environment 102 and objects that may exist within the environment. To generate the computer vision models, for example, the model generation platform 130 may employ various software components (e.g., applications, modules, and other suitable software components), which may be combined or separate, and may be co-located (e.g., executed by a same server) or distributed (e.g., executed by different servers). In the present example, the model generation platform 130 may include one or more of a video processor 132 (e.g., including software for processing videos into images), an image annotator 134, a model trainer 136, and a model evaluator 138. In other examples, the model generation platform 130 may include more or fewer software components.

The model data store 140, may represent one or more databases, file systems, and/or cached data sources. In general, the model data store 140 may be used to maintain data (e.g., in a cloud environment) that corresponds to computer vision models generated by the model generation platform 130 and/or other data that is used by computer perception pipeline processes, such as generated models and/or data used to train the models. In the present example, a single model data store 140 is shown, however in other examples, multiple different data repositories may be included for maintaining different sorts of data.

The synthetic video generation platform 160, for example, may be implemented across one or more servers, including but not limited to network servers, web servers, application servers, or other suitable computing servers. In general, the synthetic video generation platform 160 may access environment data 176 that corresponds to the environment 102 and objects within the environment, and may generate synthetic video data 178 that represents actions being performed within the environment. To generate the synthetic video data 178, for example, the synthetic video generation platform 160 may employ various software components (e.g., applications, modules, and other suitable software components), which may be combined or separate, and may be co-located (e.g., executed by a same server) or distributed (e.g., executed by different servers. In the present example, the synthetic video generation platform 160 may include one or more of a virtual replica generator 162, an environment simulator 164, a virtual camera controller 166, and a synthetic video generator 168. In other examples, the model generation platform 130 may include more or fewer software components.

In the present example, the model generation platform 130, the synthetic video generation platform 160, and the model data store 140 are shown as being implemented as separate components. However, in other examples, two or more platforms and/or data stores may be implemented within a same server or server cluster. Further, the model generation platform 130, the synthetic video generation platform 160, and the model data store 140 may each be implemented within a same local area network, or one or more components may be implemented in a separate network that is remote from other components.

The example process for generating computer vision models of a structural environment is represented in example stages (A) to (H). Stages (A) to (H) may occur in the illustrated sequence, or they may occur in a sequence that is different than in the illustrated sequence, and/or two or more stages (A) to (H) may be concurrent. In some examples, one or more stages (A) to (H) may be repeated multiple times when generating computer vision models of the structural environment.

During stages ($A_1$) and ($A_2$), real video is received of physical actions being performed in a physical space within a structural environment. For example, during stage ($A_1$), the model generation platform 130 may receive real video data 170*a* that has been captured by imaging device 120*a* (e.g., a digital video camera), and during stage ($A_2$), the model generation platform 130 may receive real video data 170*n* that has been captured by imaging device 120*n* (e.g., another digital video camera). The imaging devices 120*a-n*, for example, may be positioned such that the devices concurrently capture moving images of actions being performed in an area of the environment 102, from different angles. As another example, a single imaging device may be directed towards the area of the environment 102, and may capture moving images of actions being performed in the area.

In the present example, the portion of the environment 102 may be an area of a warehouse in which various warehouse operations are performed by various workers (e.g., including human workers and robotic workers) and/or equipment, such as receiving, putting away, storing, picking, and packing. Receiving operations, for example, may include accepting incoming shipments from suppliers and/or manufacturers. Products included in the shipments may be checked for quantity, quality, and accuracy, and any discrepancies may be documented and resolved. Putting away operations, for example, may include moving received products to a designated warehouse location for storage (e.g., manually, or by an automated robotic product handling system). The products may be organized and/or stored in the designated warehouse location based on factors such as product type, size, and demand. Storing operations, for example, may include storing the products in the designated warehouse location, using inventory management systems (not shown) to track the products, by monitoring inventory levels, tracking expiration dates, and/or ensuring that the products are stored in a manner that preserves their quality. Picking operations, for example, may include picking the products from their designated warehouse location when an order for the products is received (e.g., manually, or by the automated robotic product handling system), by identifying a product location, removing some of the products, and/or transporting the removed products to a central location for packing and/or shipping. Packing operations, for example, may include packing the products based on an order, and/or placing the packed products in a shipping area from which the packed products may be loaded on a vehicle for shipment to a customer.

The portion of the environment 102 shown in the present example includes various workers (e.g., human and/or robotic workers 104*a*, 104*b*, etc.) and/or equipment (e.g., equipment 110, which may represent various manually operated mechanical devices, or automated mechanical devices that are configured to perform physical actions in the environment 102 upon receiving computer instructions). In the present example, the workers 104*a*, 104*b* and/or equipment 110 may perform physical actions in the environment 102, including interacting with various products (e.g., products 106) or containers (e.g., containers 108*a*, 108*b*, and 108*c*) to, among other things, receive, put away, store, pick, and/or pack the products or containers. The environment 102 of the present example may also include one or more defined work areas (e.g., area 112) that may be monitored for the performance of actions by the workers and/or equipment.

During stage (B), a preliminary computer vision model of the structural environment may be generated. For example, the model generation platform 130 may perform a model generation process 172, based on the received real video data 170*a-n* of the environment 102 (optionally maintained by the model generation platform 130 and/or the model data store 140 as video data is received over time), which represents physical actions performed by the workers 104*a-b* or equipment 110 while handling the products 106 or containers 108*a-c* in the work area 112. In general, generating the preliminary computer vision model may include parsing the real video data 170*a-n* into images, performing image annotation, and/or performing model training. Operations of the model generation process 172 are described in further detail with respect to FIG. 2.

During stage (C), the preliminary computer vision model of the structural environment is maintained. For example, the model generation platform 130 may provide the preliminary computer vision model (e.g., preliminary model 174) of the structural environment to the model data store 140 for storage and/or maintenance. The preliminary model 174, for example, may be used to generate inferences regarding various actions subsequently being performed by workers or equipment in the environment 102 (e.g., based on real video streams provided by imaging devices in the environment). However, it will be appreciated that the camera perspectives on which the preliminary model 174 is based may be relatively limited (thus potentially limiting an ability of the model to generate inferences), and that performing image annotation on the real video data 170*a-n* may be a relatively time consuming process. Thus, in the present example, synthetic video data may be used to enhance and/or refine the preliminary model 174, thereby improving the ability of the model to generate inferences while saving time.

During stage (D), to prepare for the generation of synthetic video data, environment data is received that may define physical dimensions of the physical space, lighting scenarios within the physical space, and physical dimensions and/or operational characteristics of actors and/or other objects within the physical space. For example, the synthetic video generation platform 160 may receive environment data 176 that defines the physical dimensions of the environment 102, including the positions and sizes of various fixed objects in the environment that remain in a fixed position in the physical space (e.g., shelving units, conveyor belts, workstations, etc.), various movable objects in the environment that are movable throughout the physical space (e.g., products, containers, etc.), and various actors in the environment that are capable of self-directed movement (e.g., workers, automated equipment, etc.). Further, for the various actors and movable objects in the environment 102, the environment data 176 may include data that may be used to generate simulations of movement of the actors and/or movable objects throughout the environment (e.g., positions, velocities, movement patterns, etc.).

During stage (E), a synthetic video generation process 178 may be performed. In general, performing the synthetic video generation process 178 may involve generating a virtual replica 152 of the physical space and the objects within the physical space, and generating synthetic video data 180 that represents virtual actions being performed, using the virtual replica 152. To generate the virtual replica 152, for example, the synthetic video generation platform 160 may provide the environment data 176 that corresponds to the environment 102, to the virtual replica generator 162. In the present example, the virtual replica 152 may be a three-dimensional virtual representation of the environment 102, including one or more of the various fixed objects in the environment, the various movable objects in the environment, and the various actors in the environment. The synthetic video generation platform 160 may use the environment simulator 164, for example, to simulate the performance of physical actions within the virtual replica 152, thereby generating a performance of virtual actions that correspond to a performance of physical actions. The synthetic video generation platform 160 may use the virtual camera controller 166, for example, to position and control a virtual camera 150 to capture virtual video of the performance of virtual actions from a specified camera angle. The synthetic video generation platform 160 may use the synthetic video generator 168, for example, to generate the synthetic video data 180, based on the captured virtual video.

In some implementations, generating synthetic video may include generating a digital copy of a physical space, and/or generating a virtual video of a performance of virtual actions that copies a past performance of physical actions in the physical space. For example, the virtual replica 152 may be a digital copy of the environment 102 (e.g., based on the environment data 176), and the real video data 170*a-n* may be used to generate a digital copy of the actions performed in the real video data 170*a-n* (e.g., the worker 104*a* packing the products 106 into the container 108*a*, the worker 104*b* entering the work area 112, etc.). In the present example, generating the synthetic video data 180 may involve using the virtual camera controller 166 to position the virtual camera 150 such that the performance of virtual actions within the virtual replica 152 are captured from a camera angle that corresponds to a same camera angle of either of the imaging devices 120*a-n*, or from a camera angle that differs from that of the imaging devices 120*a-n*. By generating synthetic video data 180 that corresponds to a same camera angle of either of the imaging devices 120*a-n*, for example, an accuracy of the synthetic video data 180 and a usefulness of the data 180 for model training may be determined (e.g., by applying the preliminary model 174 to the synthetic video data 180 and/or determining whether the inferences produced by a perception pipeline are expected or unexpected). Through the generation of synthetic video data 180 that corresponds to a different camera angle of any of the imaging devices 120*a-n*, for example, a computer vision model may be enhanced (e.g., by providing additional training data to the model generation platform 130 that represents performed actions from the perspective of the different camera angle, without employing an additional imaging device while the actions are actually being performed).

In some implementations, generating synthetic video may include generating a digital copy of a physical space and/or fixed objects within the space, and/or generating a virtual video of a performance of new virtual actions that do not copy a past performance of physical actions in the physical space. For example, the virtual replica 152 may be a digital copy of the environment 102 and/or its fixed objects (e.g., based on the environment data 176), and the environment simulator 164 may be used to generate the new virtual actions within the virtual replica 152. For example, the virtual replica 152 may include a representation of fixed objects within the environment 102 (e.g., including a location and orientation of shelving units, conveyor belts, workstations, etc.), and/or rules for simulating the movement of the various movable objects in the environment (e.g., products, containers, etc.). The actions of the various actors in the environment (e.g., workers, automated equipment, etc.) may be applied to generate synthetic video data 180 that represents the performance of the new virtual actions. In the present example, generating the synthetic video data 180 may involve using the virtual camera controller 166 to position the virtual camera 150 such that the performance of new virtual actions within the virtual replica 152 are captured from a camera angle that corresponds to a same camera angle of either of the imaging devices 120*a-n*, or from a camera angle that differs from that of the imaging devices 120*a-n*. Through the generation of synthetic video data 180 that corresponds to new virtual actions that do not copy a past performance of physical actions in the environment 102, for example, a vast amount of training data may be provided to the model generation platform 130 for a given configuration of the environment 102, without capturing real video data of the actions being performed.

In some implementations, generating a synthetic video may include generating a digital representation of a new space, and generating a virtual video of a performance of new virtual actions in the new space. For example, the virtual replica 152 may be a digital representation of a reconfiguration of the environment 102 (e.g., based on a manipulation of the environment data 176), and the environment simulator 164 may be used to generate the new virtual actions within the virtual replica 152. For example, the virtual replica 152 may include a representation of fixed objects that may or may not exist within the existing environment 102 (and possibly at new positions and/or orientations), and rules for simulating the movement and actions of various movable objects and actors that may or may not exist in the existing environment 102. The synthetic video data 180, for example, may represent the new virtual actions, according to the performed simulation of the reconfiguration of the environment 102 represented in the virtual replica 152. In the present example, generating the synthetic video data 180 may involve using the virtual camera controller 166 to position the virtual camera 150 such that the performance of new virtual actions within the virtual replica 152 are captured from a camera angle that corresponds to a same camera angle of either of the imaging devices 120*a-n*, or from a camera angle that differs from that of the imaging devices 120*a-n*. Through the generation of synthetic video data 180 that corresponds to new virtual actions being performed according to a simulation of a new environment that exists only as a digital representation (e.g., a reconfiguration of the environment 102 represented in the virtual replica 152), for example, a vast amount of training data may be provided to the model generation platform 130 for various different possible reconfigurations of the environment 102, without physically reconfiguring the environment and without capturing real video of the actions being performed. Thus, the speed at which computer vision models are trained may be increased, while avoiding stoppages that may occur when reconfigurations are performed.

Optionally, a possible reconfiguration reflected in the virtual replica 152 may be used to perform simulations that test the performance of various optimization scenarios, without performing a physical reconfiguration of the environment 102. Such optimization scenarios may generally be determined through a visualization and analysis of perception metadata, as described with respect to FIG. 3 and the examples of 6A-6D.

During stage (F), synthetic video data is received. For example, the model generation platform 130 may receive the synthetic video data 180 generated by the synthetic video generation platform 160. As described above, the synthetic video data 180 may represent virtual actions being performed in the virtual replica 152 of an environment (e.g., the environment 102, or a reconfiguration of the environment 102). In general, since the synthetic video data 180 has been computer-generated, annotation of the data (e.g., labeling the fixed objects, movable objects, and actors represented in the data) may be automatically performed while generating the data. For example, the synthetic video data 180 may include coordinates/polygons of objects of interest (e.g., fixed objects, movable objects, and actors), along with data that identifies the objects of interest, thereby reducing or eliminating the manual labeling of the data 180.

During stage (G), a refined computer vision model of the structural environment is generated. For example, the model generation platform 130 may again perform the model generation process 172, based on the received real video data 170*a-n* of the environment 102, and/or based on the received synthetic video data 180 of virtual actions being performed within the virtual replica 152. Operations of the model generation process 172 are described in further detail with respect to FIG. 2.

During stage (H), the refined computer vision model of the structural environment is maintained. For example, the model generation platform 130 may provide the refined preliminary computer vision model (e.g., refined model 184) of the structural environment to the model data store 140 for storage and/or maintenance. The refined model 184, for example, may be used to generate improved inferences regarding subsequent actions being performed by workers and/or equipment in the environment 102 (e.g., based on real video streams provided by imaging devices in the environment).

Figure 2:
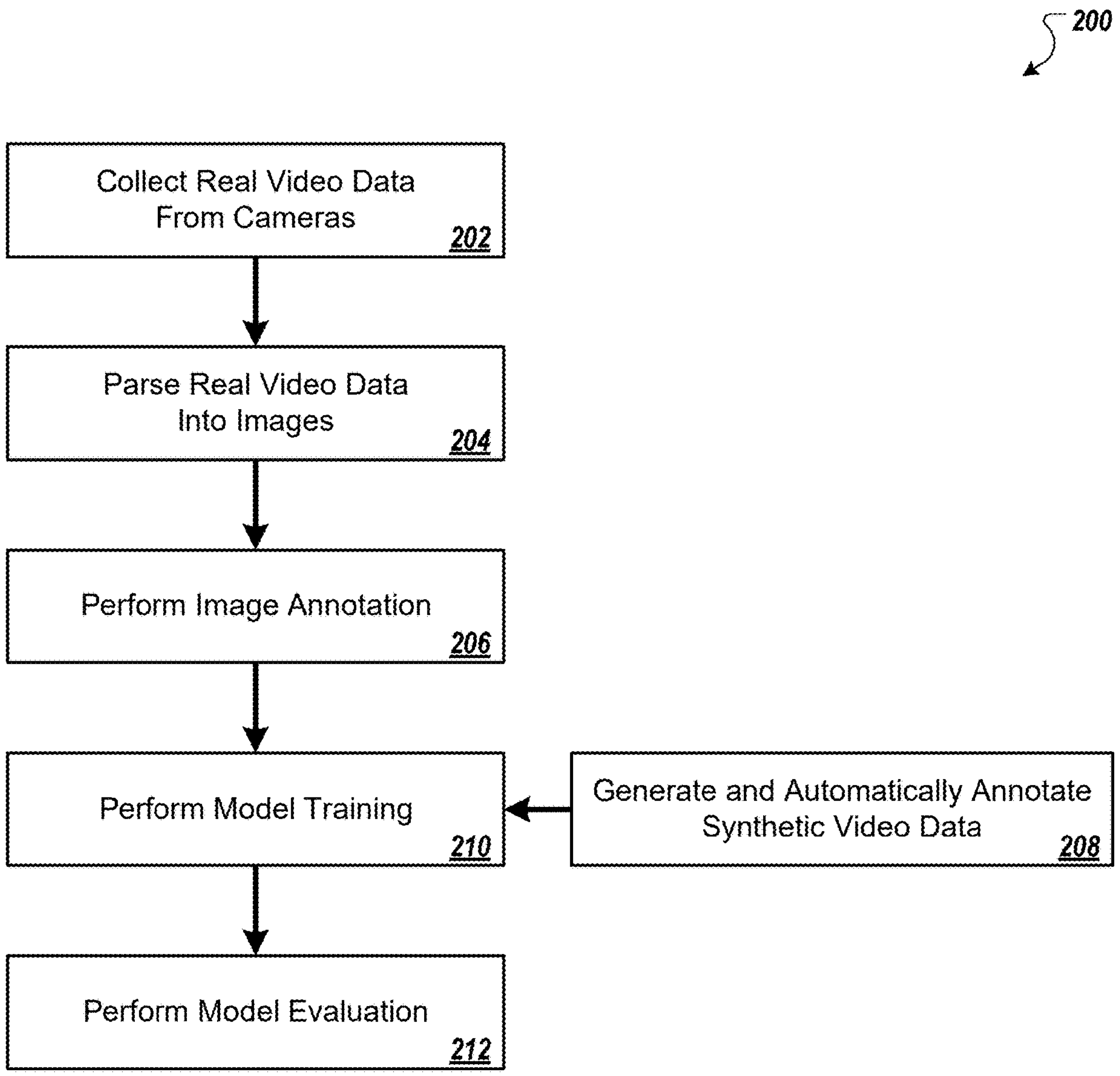
FIG. 2 is a flow diagram of an example technique for generating computer vision models, based on real video data and synthetic video data.

FIG. 2 is a flow diagram of an example technique 200 for generating computer vision models, based on real video data and synthetic video data. Operations included in the example technique 200, for example, may be performed asynchronously and repeatedly, to incrementally improve the computer vision models over time as additional training data becomes available (e.g., additional real video data and/or synthetic video data). In the present example, the technique 200 may be performed by components of the system 100 (shown in FIG. 1) according to stages (A), (B), (E), (F), and (G), and will be described as such for clarity. However, the technique 200 may also be performed by other generation platforms.

At 202, real video data is collected from one or more cameras. For example, during stages ($A_1$) and ($A_2$), real video data 170*a* and 170*n* is collected from respective imaging devices 120*a* and 120*n* (e.g., respective digital video cameras). In the present example, the real video data 170*a-n* may include representations of human and/or robotic workers 104*a* and 104*b*, and/or representations of the equipment 110 performing physical actions in the environment 102, including the work area 112. The physical actions, for example, may include interactions with the products 106 or containers 108*a*, 108*b*, and 108*c*. As another example, the physical actions may include, but are not limited to, entering the work area 112, dwelling within the work area 112, and exiting the work area 112.

At 204, the real video data is parsed into images. For example, the model generation platform 130 may use the video processor 132 to parse the real video data 170*a-n* collected from the imaging devices 120*a-n* into a series of consecutive images, which may collectively represent physical actions being performed within the environment 102 over time. Each of the consecutive images, for example, may represent a different instance in time, according to a frame rate of the captured real video data 170*a-n*.

At 206, image annotation is performed. For example, the model generation platform 130 may use the image annotator 134 to identify and label particular entities represented in the series of consecutive images as being entities of interest (e.g., fixed objects, movable objects, actors, etc.). In the present example, workers 104*a* and 104*b* may each be identified and labeled as instances of human workers (e.g., "Worker A" and "Worker B"), the equipment 110 may be identified and labeled as an instance of a particular type of equipment (e.g., "Equipment A"), the products 106 may be identified and labeled as instances of a particular type of product (e.g., "Product A"), the containers 108*a*, 108*b*, and 108*c* may be identified and labeled as instances of particular type of container (e.g., "Box A"), and the work area 112 may be labeled as a defined work area (e.g., "Work Area A"). In some implementations, identifying and labeling entities may be performed at least in part as a manual process. For example, a human operator of the model generation platform 130 may review the series of consecutive images and may identify and label particular entities of interest. In some implementations, identifying and labeling entities may be performed at least in part as an automated process. For example, an automated entity identification and/or labeling process may identify entities within an image, and may provide suggested labels for the identified entities (which may optionally be confirmed or overridden by a human operator). As another example, after entities have been identified and/or labeled in an image, the automated entity identification and labeling process may track the entities across subsequent images, and may automatically apply labels to the entities.

At 208, synthetic video data is generated and automatically annotated. For example, during stages (E) and (F), the synthetic video generation platform 160 may generate and provide the synthetic video data 180 that represents virtual actions being performed within the virtual replica 152 of the environment 102 (or a reconfiguration of the environment 102). In the present example, since the synthetic video data 180 has been computer-generated, annotation of the data (e.g., labeling the fixed objects, movable objects, and actors represented in the data) may be automatically performed while generating the data, thus saving the time and resources that would have been spent if the data had been based on the capture of real video and had been manually labeled.

At 210, model training is performed to generate a new computer vision model, and/or to refine an existing computer vision model. For example, during stage (B), the model generation platform 130 may use the model trainer 136 to generate the preliminary model 174 (e.g., based on the real data collected at 202, the parsing of the real data into images at 204, and the image annotation performed at 206). As another example, during stage (G), the model generation platform 130 may use the model trainer 136 to generate the refined model 184 (e.g., based on an additional iteration of 202, 204, and 206, and/or based on the synthetic video data that has been generated and automatically annotated at 208. In general, a training process employed by the model trainer 136 for generating computer vision models may include Deep Neural Networks (DNNs), convolutional neural networks (CNNs), Faster R-CNN, Detection Transformer (DETR), classification models, or other techniques that are suitable for use in computer vision applications. For example, an end-to-end neural network (e.g., YOLO) may be used to make predictions of bounding boxes and class probabilities at once. Advantageously, the neural networks may represent various objects (fixed objects, movable objects, and actors that operate in physical space) volumetrically, allowing for a handling of complex geometries, occlusions, and lighting scenarios. In other examples, traditional image processing techniques may be used, such as contour detection, edge detection, object detection based on color distribution, etc.

At 212, model evaluation is performed. For example, the model generation platform 130 may use the model evaluator 138 to evaluate the performance of the preliminary model 174 and/or the refined model 184. In general, evaluating a computer vision model may include receiving new video data (e.g., either new real video data 170*a-n* or new synthetic video data 180), using the computer vision model to recognize entities in the new video data (e.g., through a perception pipeline employed by the model), and/or determining whether the model performs as expected. In the case of performing an evaluation of a computer vision model with new real video data 170*a-n*, for example, the received data may be unlabeled, and determining whether the model performs as expected may include determining whether objects represented in the data are labeled by the model as they would be through manual/automated labeling processes (e.g., through the image annotation operations at 206). In the case of performing an evaluation of a computer vision model with new synthetic video data 180, for example, the computer vision model may be used to recognize entities in an unannotated version of the received data, and determining whether the model performs as expected may include determining whether objects represented in the data are labeled by the model in a manner that conforms to the labeling in an annotated version of the received data.

In general, evaluating the performance of a generated (or regenerated) computer vision model may help identify scenarios in which the computer vision model performs well, and scenarios in which the computer vision model performs poorly. For scenarios in which the computer vision model performs poorly, for example, additional training data may be generated and the model may be retrained using the additional training data. For example, the synthetic video generation platform 160 may be used to generate synthetic video data 180 from a variety of different camera angles, including a variety of different simulated actions, to replicate images that may rarely occur in the real video data 170*a-n*, thus providing a more robust set of training data. For scenarios in which the computer vision model performs well, a physical environment may be altered such that real video is captured from preferred camera angles. For example, if the computer vision model performs well on synthetic video data 180 of the virtual replica 152 that has been captured by the virtual camera 150 from a particular camera angle, an imaging device that is configured to capture real video of the environment 102 (e.g., one of the imaging devices 120*a-n*) may be repositioned to conform to the angle of the virtual camera 150. Thus, the impact of different camera angles may be efficiently explored in a virtual space, and results of the exploration may be advantageously applied to a physical space.

Figure 3:
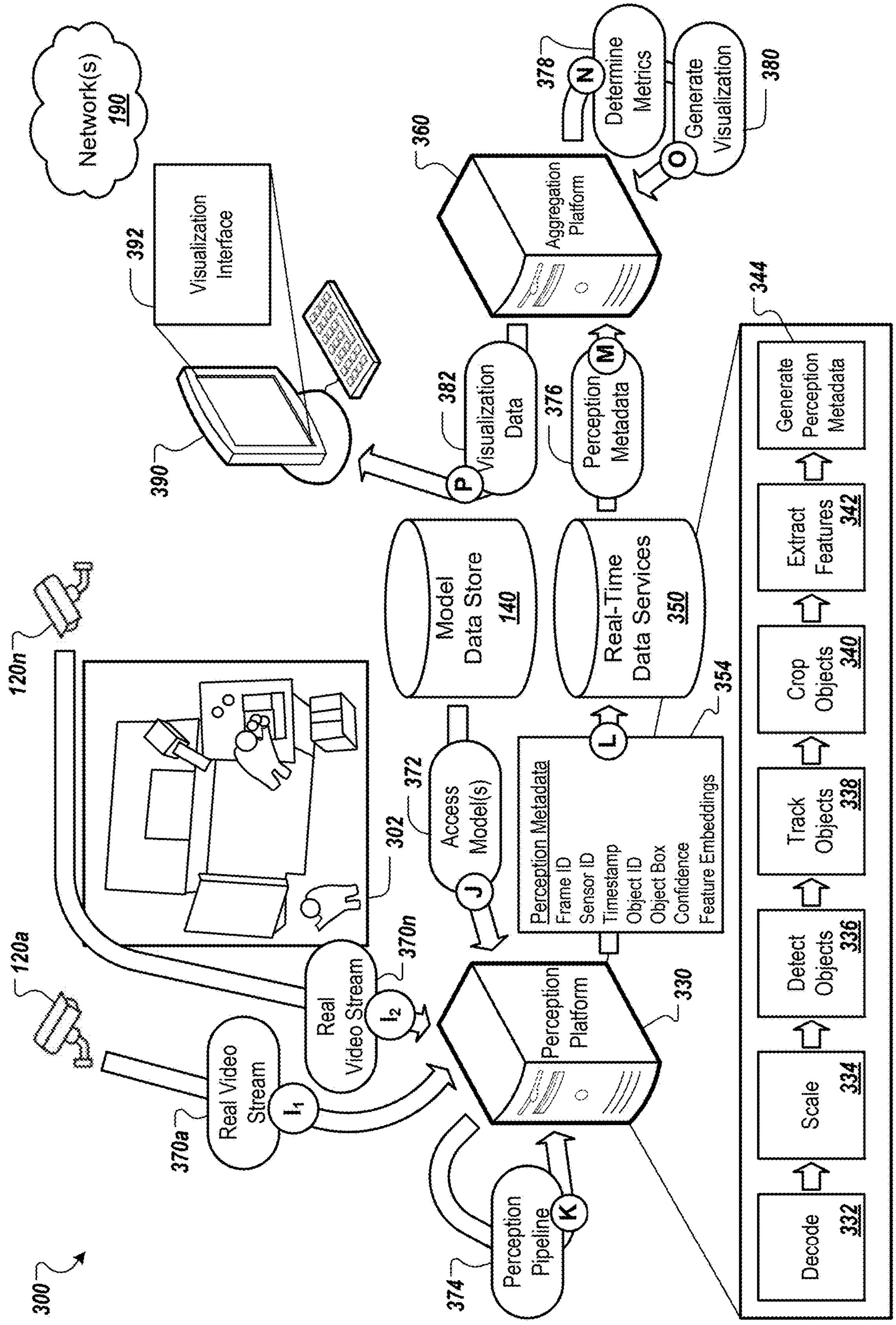
FIG. 3 is a conceptual diagram of an example system and an example process for employing computer vision models of a structural environment.

FIG. 3 is a conceptual diagram of an example system 300 and an example process (represented in stages (I) to (P)) for employing computer vision models of a structural environment. In general, the system 300 may include various data collection devices, computing devices, computing server systems, and/or data stores, configured to communicate with each other over one or more networks. For example, the system 300 may include one or more imaging devices 120*a-n* (also shown in FIG. 1), a perception platform 330, the model data store 140 (also shown in FIG. 1), real-time data services 350, an aggregation platform 360, and/or a client computing device 390, that may communicate and exchange data over network(s) 190 (e.g., including one or more LANs (local area networks), WANs (wide area networks), and/or the Internet).

Similar to the system 100 described with respect to FIG. 1, for example, the imaging devices 120*a-n* (e.g., digital video cameras or other suitable types of imaging devices) of the system 300 may be capable of capturing moving images of actions that occur in an environment 302 (e.g., an indoor or outdoor physical space, such as an interior and/or exterior of a structural environment). The environment 302, for example, may be a same environment as the environment 102 (shown in FIG. 1) but at later time than the time at which the computer vision model(s) of the structural environment were generated. As another example, the environment 302 may be a different environment from the environment 102, but may include similar types of objects/actors as the objects/actors included in the environment 102. In the present example, a stream of video data that corresponds to captured moving images of the environment 302 may be transmitted by the imaging devices 120*a-n* to the perception platform 330 over the network(s) 190, for further processing.

The perception platform 330, for example, may be implemented across one or more servers, including but not limited to network servers, web servers, application servers, or other suitable computing servers. In general, the perception platform 330 may access one or more real video streams of physical actions being performed in the environment 302, and may apply computer vision models that are accessible from the model data store 140, to generate perception metadata that represents the physical action being performed. The perception metadata, for example, may be provided to the real-time data services 350.

The real-time data services 350, for example, may represent one or more databases, file systems, and/or cached data sources, and may include mechanisms for providing maintained data to platforms and devices that request the data. In general, the real-time data services 350 may be used to maintain and/or provide, in real-time (or near real-time), perception metadata that has been generated by the perception platform 330. For example, the real-time data services 350 may include data repositories that maintain raw and/or processed data (e.g., implemented via an event streaming platform or another suitable mechanism) that is accessible using one or more data access techniques (e.g., retrieval queries, topic subscriptions, or other suitable techniques). In the present example, the real-time data services 350 is shown as a single component, however in other examples, the real-time data services 350 may be distributed across multiple data repositories and/or server platforms.

The aggregation platform 360, for example, may be implemented across one or more servers, including but not limited to network servers, web servers, application servers, or other suitable computing servers. In general, the aggregation platform 360 may access the generated perception data from the real-time data services 350, may transform the data to quantify the occurrence of particular actions within the environment 302, and may generate data for a visualization of the transformed data. The visualization data, for example, may be provided to the client computing device 390.

The client computing device 390, for example, may represent various forms of stationary or mobile processing devices including, but not limited to a desktop computer, a laptop computer, a tablet computer, a personal digital assistant (PDA), a smartphone, or another sort of processing device. The client computing device 390, for example, may include one or more input devices for receiving input from a device user (e.g., keyboards, pointers, microphones, etc.), and may include one or more output devices for providing output to the device user (e.g., displays, speakers, printers, etc.). In the present example, requests for visualizations of aggregated perception data may be received from the client computing device 390, and the corresponding visualizations may be provided to the client computing device 390. The present example shows a single client computing device 390 included in the system 300, however in other examples, many different client computing devices 390 may exist in the system 300.

In the present example, the perception platform 330, the aggregation platform 360, the model data store 140, the real-time data services 350, and the client computing device 390 are shown as being implemented as separate components. However, in other examples, two or more platforms, data stores, and/or services may be implemented within a same server or server cluster. Further, the perception platform 330, the aggregation platform 360, the model data store 140, the real-time data services 350, and various client computing devices 390 may be implemented within a same local area network, or one or more components may be implemented in a separate network that is remote from other components.

The example process for employing computer vision models of a structural environment is represented in example stages (I) to (P). Stages (I) to (P) may occur in the illustrated sequence, or they may occur in a sequence that is different than in the illustrated sequence, and/or two or more stages (I) to (P) may be concurrent. In some examples, one or more stages (I) to (P) may be repeated multiple times when employing computer vision models of the structural environment.

During stages ($I_1$) and ($I_2$), real video streams are received of subsequent physical actions being performed in a physical space within a structural environment, at a time that is after the time at which computer vision models were generated for identifying objects, actors, and/or actions in the structural environment. For example, during stage ($I_1$), the perception platform 330 may receive a real video stream 370*a* that has been captured by imaging device 120*a* (e.g., a digital video camera), and during stage ($I_2$), the perception platform 330 may receive a real video stream 370*n* that has been captured by imaging device 120*n* (e.g., another digital video camera). In some examples, the real video streams 370*a-n* may be compressed using various video compression techniques, thereby facilitating the transmission of data in scenarios in which the model generation platform 130 is a cloud server, or otherwise remote from the imaging devices 120*a-n*. The imaging devices 120*a-n*, for example, may be positioned such that the devices concurrently capture respective real video streams including moving images of actions being performed in an area of the environment 302, from different angles. As another example, a single imaging device may be directed towards the area of the environment 302, and may capture a real video stream including moving images of actions being performed in the area. In the present example, the imaging devices 120*a-n* may be the same devices that were used to collect real video data 170*a-n* (shown in FIG. 1), however, in other examples, the imaging devices may be different devices. In general, the subsequent physical actions may be similar to the types of actions that are represented in the real and synthetic video data that had been used to train the computer vision model(s) (e.g., as described with respect to FIG. 1 and FIG. 2). For example, the subsequent physical actions may include various warehouse operations, such as receiving, putting away, storing, picking, and/or packing.

During stage (J), a model access operation 372 is performed. For example, the perception platform 330 may communicate with the model data store 140 to access one or more computer vision models that have been trained and generated for identifying objects, actors, and/or actions in the structural environment. The computer vision models, for example, may include the refined model 184 (shown in FIG. 1), which may optionally include one or more specialized models, such as object detection models, segmentation models, tracking models, and so forth.

During stage (K), the perception platform 330 applies the one or more computer vision models to a perception pipeline 374, to generate perception metadata 354 that represents the subsequent actions being performed. In general, the perception pipeline 374 may include a series of data transformation operations that are sequentially applied to image frames of a real video stream (e.g., one or more of the real video streams 370*a-n*). In the present example, the series of data transformation operations of the perception pipeline 374 may include one or more of a decoding operation 332, a scaling operation 334, an object detection operation 336, an object tracking operation 338, an object cropping operation 340, a feature extraction operation 342, and a perception metadata generation operation 344. In other examples, the series of data transformation operations of the perception pipeline 374 may include more, fewer, or different operations.

The decoding operation 332, for example, may receive one or more of the real video streams 370*a-n* as input. Upon receiving the real video stream(s) 370*a-n*, the perception platform 330 may employ a decoding engine to transform the real video stream(s) 370*a-n* into a series of video frames of a specified format. The series of formatted video frames may then be maintained in memory for accessibility by downstream operations.

The scaling operation 334, for example, may access the series of formatted video frames in memory and may rescale the frames and/or alter the frame rate. For example, the video frames may have been captured at a high resolution and/or a high frame rate that is computationally expensive to process. By downscaling the series of video frames and/or by reducing the frame rate, for example, subsequent operations in the perception pipeline 374 may be less computationally expensive. Optionally, the series of formatted video frames may be rescaled and/or the frame rate may be altered to match the resolution and/or the frame rate of video that had been used when performing model training.

The object detection operation 336, for example, may involve the application of one or more detection models and/or segmentation models that are configured to detect instances of particular types of entities (e.g., human workers, robotic workers, equipment, products, containers, work areas, etc.) represented in the series of video frames. The output of the object detection operation 336, for example, may include output vectors with class probabilities, object scores, and/or bounding boxes. The output vectors, for example, may be associated with the series of video frames. An example output of the object detection operation 336 is described in further detail with respect to FIG. 5.

In general, object detection models may perform an image classification process that predicts the class of an object identified within a video frame, and/or an object localization process that locates the object within the video frame. To perform object identification, classification, and/or localization, for example, image characteristics may be extracted from an input video frame (e.g., using Cross Stage Partial Networks or another suitable type of convolutional neural network) to generate feature pyramids, which may enable an object detection model to successfully generalize for object scaling (e.g., identifying a same object in various sizes and scales). The feature pyramids, for example, may also enable object detection models to effectively perform on previously unseen data.

In general, instance segmentation models may perform a combination of semantic segmentation and object detection, to detect and delineate distinct instances of an object appearing in a video frame. Instance segmentation processes may include the generation of a segment map for each category and instance of a class. By analyzing the output of an instance segmentation model, the bounding boxes of entities represented in a video frame may be located, segmentation maps of the entities may be plotted, and the entity instances may be counted.

The object tracking operation 338, for example, may involve the application of a tracking algorithm to track the movement of instances of objects across the series of video frames, and may involve the application of a unique identifier to each of the object instances. The tracking algorithm, for example, may include a correlation filter-based discriminative learning algorithm for visual object tracking, and may include a data association algorithm and a state estimator for multi-object tracking. Operations of the object tracking operation 338 are described in further detail with respect to FIG. 4.

The object cropping operation 340, for example, may involve the isolation and cropping of each object that has been identified in the video frames. After the objects have been cropped, representations of the cropped objects may be provided to downstream operations for further analysis. For example, the representations of the cropped objects may be provided as an input to a feature extraction model.

The feature extraction operation 342, for example, may employ the feature extraction model to generate feature embeddings for the representations of the cropped objects. In general, the generation of feature embeddings may involve the transformation of the representations of the cropped objects into numerical features. The feature embeddings (e.g., the numerical features) may be readily consumed by downstream operations, including operations for generating perception metadata.

The perception metadata generation operation 344, for example, may involve the generation of perception metadata 354, for each of the objects that have been identified and cropped in each of the video frames. Perception metadata may generally follow a defined schema. In the present example, a perception metadata schema may include one or more of a frame identifier, a sensor identifier, a timestamp, an object identifier, an object box, a confidence value, and the generated feature embeddings.

Figure 4:
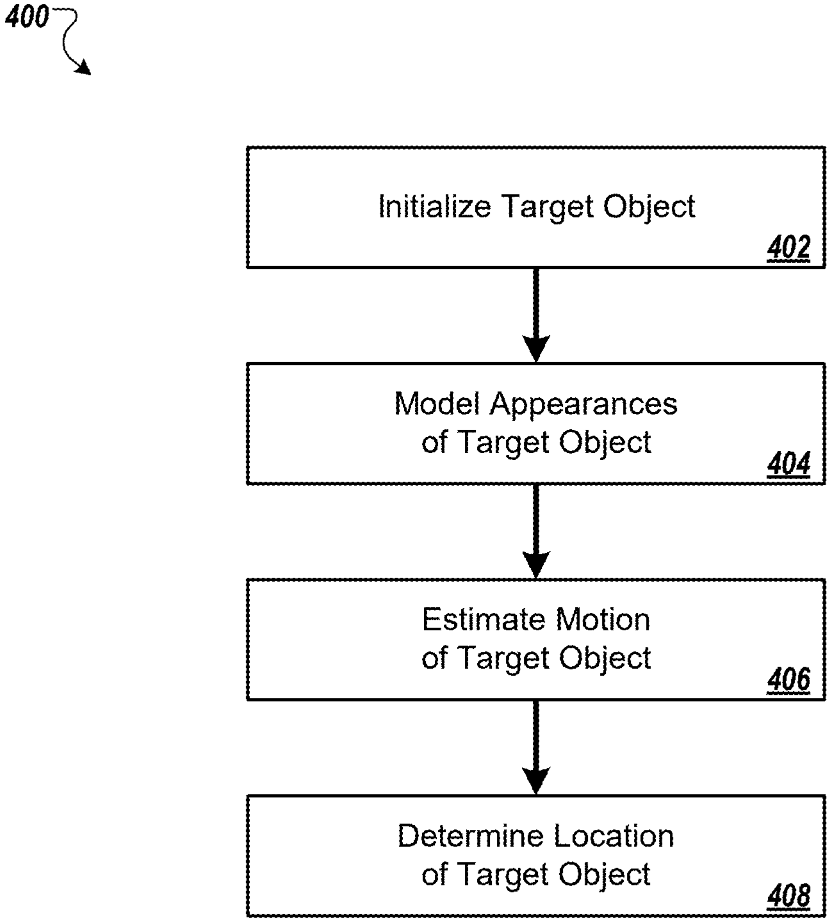
FIG. 4 is a flow diagram of an example technique for performing object tracking in a perception pipeline.

Referring now to FIG. 4, a flow diagram is shown of an example technique 400 for performing object tracking in a perception pipeline. Operations included in the example technique 400, for example, may be performed to track the movement of instances of objects across a series of video frames (e.g., during the object tracking operation 338 of the perception pipeline 374, shown in FIG. 3). In the present example, the technique 400 may be performed by the perception platform 330 of the system 300 (shown in FIG. 3), and will be described as such for clarity. However, the technique 400 may also be performed in other contexts.

At 402, a target object is initialized. In general, a target object may be an object of interest in series of video frames, which may be identified by a bounding box surrounding the target object. Typically, the target object may be identified in an initial frame, and a tracking algorithm may then be used to predict the position of the target object in subsequent frames.

At 404, appearances of the object are modeled. In general, appearance modeling involves the modeling a target object's visual appearance. When a target object undergoes various different scenarios (e.g., different lighting conditions, different angles, different speeds, etc.), the appearance of the object may vary, resulting in a potential loss of tracking of the object. Appearance modeling may be performed through modeling algorithms to capture the different changes and distortions introduced while the target object moves. The performance of appearance modeling, for example, may include visual representation modeling techniques (e.g., constructing object descriptions using visual features), and may include statistical modeling techniques (e.g., building mathematical models for object identification through statistical learning).

At 406, the motion of the target object is estimated. Once the target object has been defined and its appearance has been modeled, for example, motion estimation may be performed to infer the predictive capacity of the model to accurately predict the object's future position. In general, motion estimation is a dynamic state estimation problem that may be solved by employing predictors such as linear regression techniques, Kalman filters, or particle filters.

At 408, a location of the target object is determined. In general, motion estimation may approximate a region where a target object is most likely to be found. Once an approximate location of the target object has been determined, for example, a visual model may be employed to pinpoint the exact location of the target object. Determining a location of a target object may be performed by a greedy search, maximum posterior estimation based on motion estimation, or another suitable location determination technique.

Figure 5:
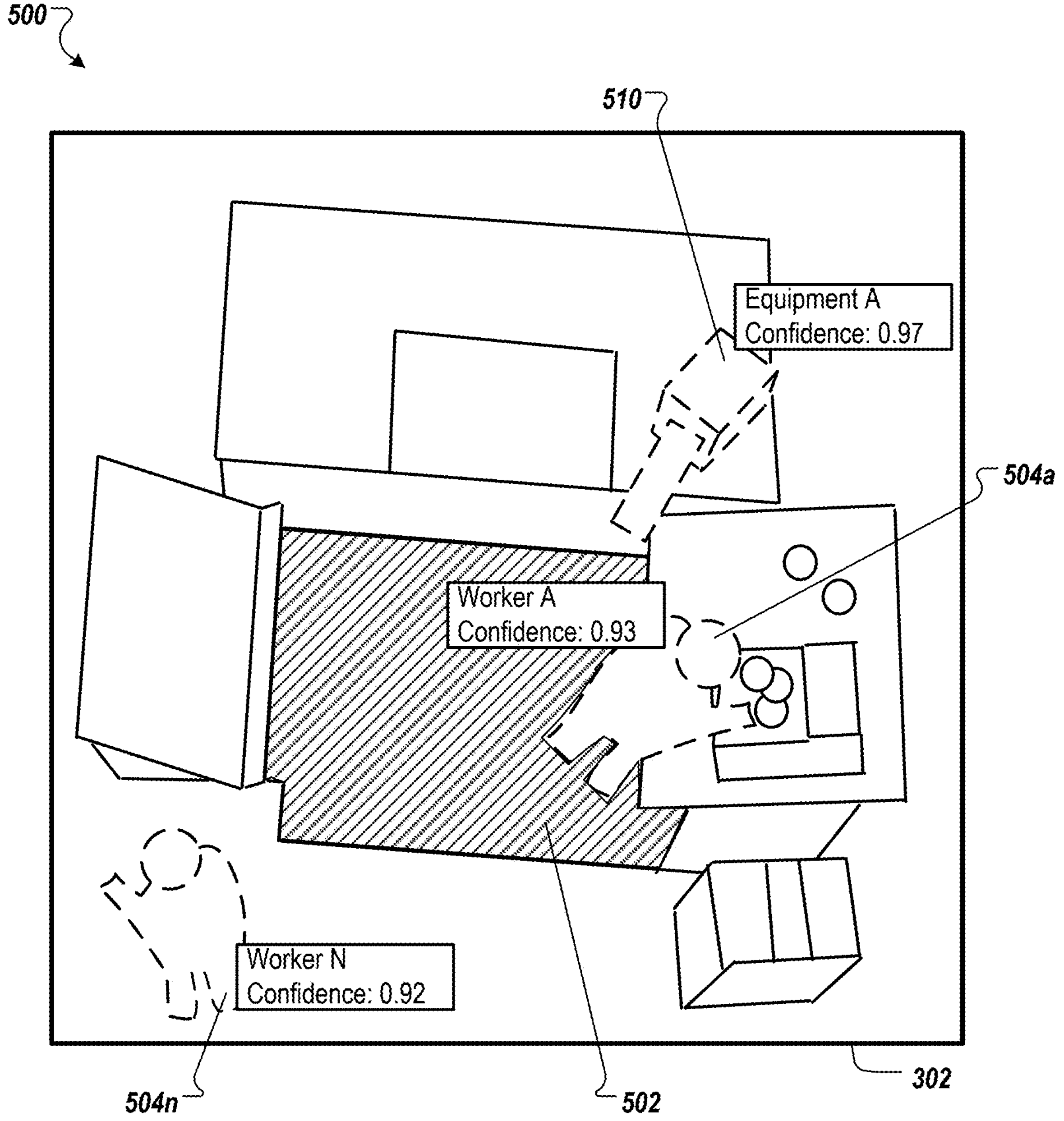
FIG. 5 is an example output of an object detection operation performed within a perception pipeline.

Referring now to FIG. 5, an example output 500 is shown of an object detection operation performed within a perception pipeline. For example, the output 500 may represent an output of the object detection operation 336 (shown in FIG. 3) by the perception platform 330 (also shown in FIG. 3) on a video frame included in one of the real video streams 370*a-n*. In the present example, the object detection models and instance segmentation models may be configured to detect instances of various objects identified in captured video of the environment 302 (also shown in FIG. 3), including workers 504*a* (e.g., "Worker A") and 504*n* (e.g., "Worker N"), a type of mechanical equipment 510 (e.g., "Equipment A"), and/or a defined work area 502. In some examples, workers may be identified as general instances of a worker object type (without identifying specific instances), whereas in other examples, workers may be specifically identified. As shown in the present example, each of the objects 504*a*, 504*n*, and 510, may be labeled with a respective identifier and confidence value. Further, each of the objects 504*a*, 504*n*, and 510, and the area 502 may be segmented and associated with a corresponding bounding box.

By tracking the detected objects across a series of video frames (e.g., through the object tracking operation 338, shown in FIG. 3), and by quantifying relevant object data (e.g., through the feature extraction operation 342 and the perception metadata operation 344, shown in FIG. 3), insights into the actions being performed in the environment 302 and/or the use of work area 502 may be determined. For example, a count of workers present within the work area 502 may be performed for any given video frame (or corresponding instant in time). As another example, an amount of time that a worker dwells within the work area 502 may be determined by tracking the movement of the worker across a series of video frames, including determining when the worker enters the work area 502 and when the worker exits the work area 502. As another example, interactions between objects (e.g., interactions between the worker 504*a* and the equipment 510 or other sorts of interactions) may be identified and quantified (e.g., determining a number of interactions of a particular type per specified time period). For example, worker locations and worker interactions with objects (e.g., products) may be correlated by time, day of week, month, season, etc. Many sorts of insights regarding the occurrence of actions within the environment 302 are possible, through other examples.

Referring again to FIG. 3, during stage (L), perception metadata that has been generated from the real video stream (s) is maintained. For example, the perception platform 350 may provide the perception metadata 354 for a particular identified object within a particular video frame to the real-time data services 350 for maintenance. The perception metadata 354, for example, may be stored with other perception metadata, and may later be aggregated with the other perception metadata for the purpose of determining insights related to the actions being performed in the environment 302.

During stage (M), at least a portion of the perception metadata maintained by the real-time data services 350 (e.g., perception metadata 376) may be received. For example, the aggregation platform 360 may receive the perception metadata 376 (e.g., through a retrieval query, through a topic subscription, or through another data access technique) from the real-time data services 350. The perception metadata 376, for example, may be used by the aggregation platform 360 to generate visualizations (e.g., dashboard interfaces) that represent the actions being performed in the environment 302, based on an aggregation of the perception metadata 376.

During stage (N), metrics may be determined, based on perception metadata. For example, the aggregation platform 360 may determine metrics 378 related to the performance of actions that have been captured in the real video streams 370*a-n* and that are represented in the perception metadata 376. In general, the metrics 378 may be related to the identified interactions between objects (e.g., workers and equipment, workers and containers, workers and products, workers and other workers, etc.), the locations of workers relative to defined areas, and/or the movements of workers over time. Depending on a purpose of a metric, for example, the metrics 378 may be determined by aggregating perception metadata 376 that pertains to a given instant in time (e.g., based on identifying objects in a single video frame), and/or by aggregating perception metadata 376 that pertains to a given period of time (e.g., based on tracking objects over a sequence of video frames). For example, a worker count metric may involve a determination of a number of workers in a defined area at a given instant in time. As another example, an area congestion metric may involve a determination of a percentage of a defined area that is occupied by objects (e.g., workers, products, and/or containers), either at a given instant time, or over a period of time (e.g., expressed as an average percentage of area that is occupied). As another example, a time away metric may involve a determination of an amount of time (or a percentage of time over a time period) that a defined area is not occupied. As another example, a queue wait time may involve a determination of an amount of time (or an average amount of time) that a worker waits to use a particular piece of equipment and/or to enter a particular defined area. As another example, a movement metric may involve a determination of locations in which workers are present, and/or a determination of routes used by workers for navigating defined areas. Other sorts of metric determinations are possible.

During stage (O), a visualization of the determined metrics is generated, and during stage (P), the generated visualization is provided for presentation at a client computing device. For example, the aggregation platform 360 may perform a visualization generation process 380 based on the determined metrics 378, and may provide visualization data 382 for presentation at a visualization interface 392 of the client computing device 390. Example visualizations of aggregated perception metadata are described with respect to FIGS. 6A-6D.

Figure 6A:
FIGS. 6A-6D are example visualizations of aggregated perception metadata.

Referring now to FIG. 6A, example visualization 600 of aggregated perception metadata is shown. In the present example, the visualization 600 is a heat map that represents the movement of workers throughout a physical space within a structural environment over time. To generate the heat map, for example, the aggregation platform 360 may aggregate perception metadata 376 that represents the location of workers in the environment 302 over time, and may overlay a visual indication (e.g., a defined color or another indication) to areas in the visualization 600 at which workers are more commonly located. For example, the visualization 600 may include visual indications 602*a-n* that represent locations at which workers typically dwell.

Figure 6B:
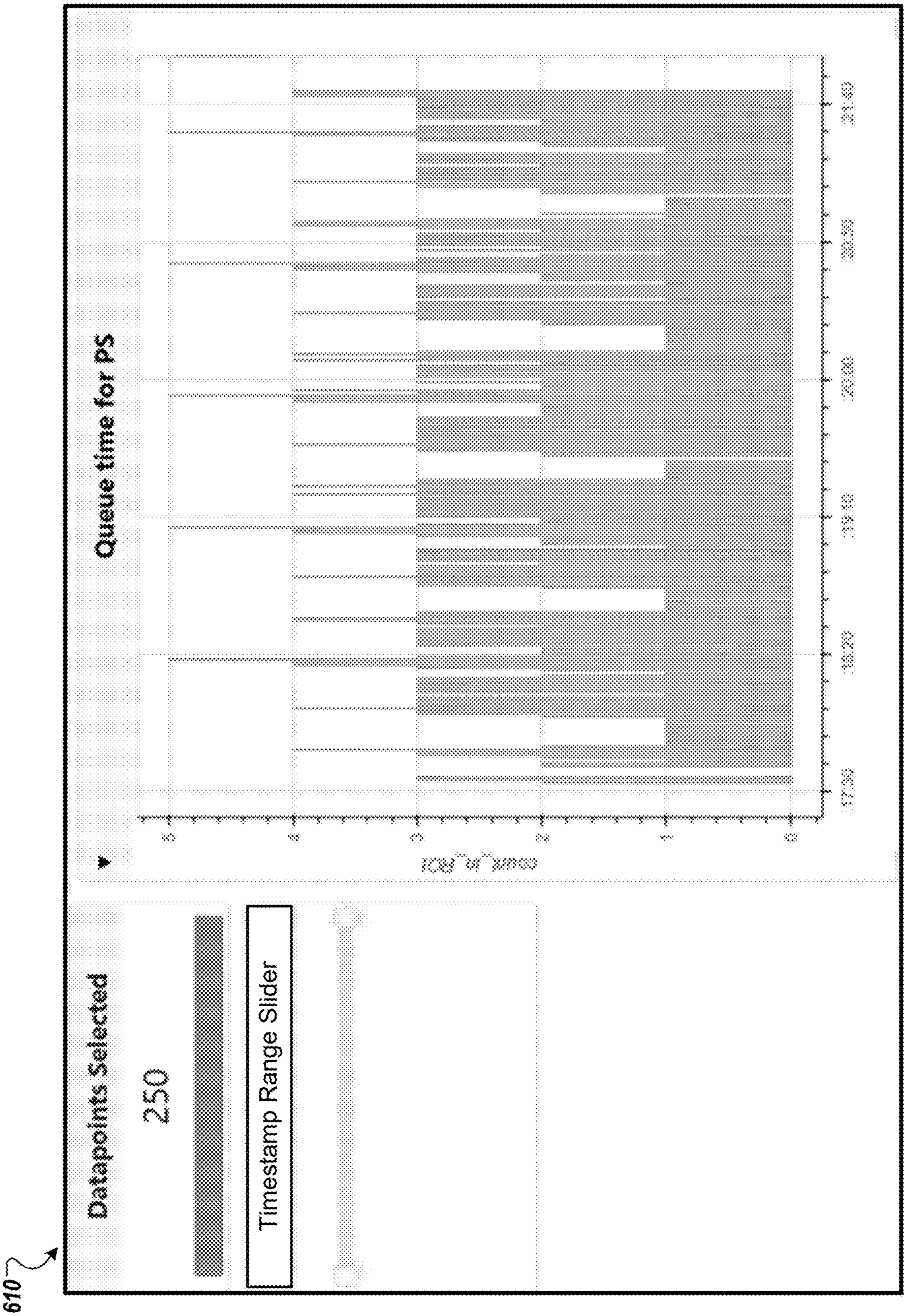

Referring now to FIG. 6B, example visualization 610 of aggregated perception metadata is shown. In the present example, the visualization 610 is a bar graph that plots a queue time (e.g., expressed in minutes) over a series of consecutive time intervals. To generate the bar graph, for example, the aggregation platform 360 may aggregate perception metadata 376 that represents instances of workers being idle in a defined queue area for a workstation or a piece of equipment. Upon determining a queue time for the workstation or piece of equipment (e.g., an amount of time that workers remain idle in the defined queue area) for each time interval, for example, the corresponding visualization 610 may be generated.

Figure 6C:
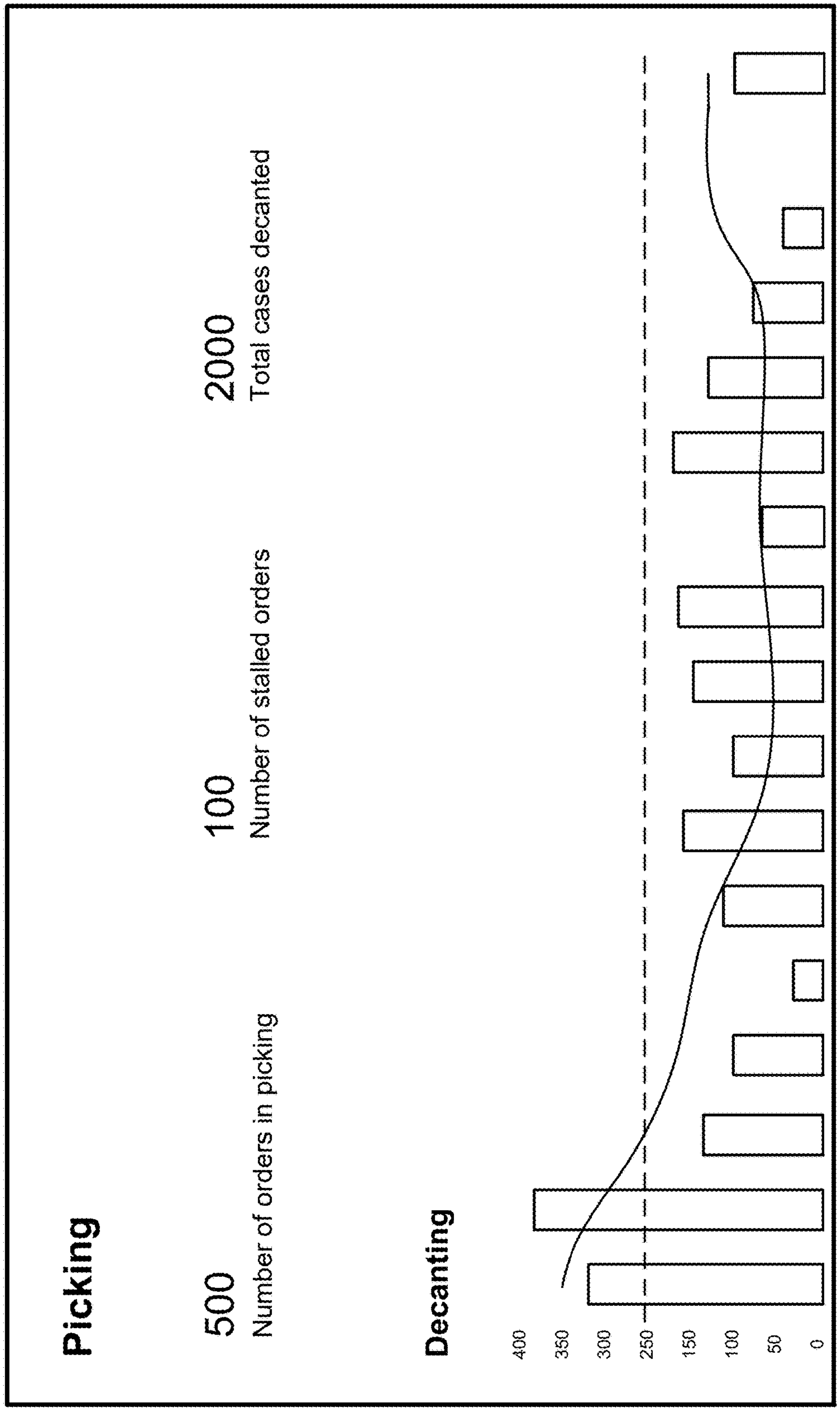

Referring now to FIG. 6C, example visualization 620 of aggregated perception metadata is shown. In the present example, the visualization 620 is a bar graph that plots occurrences of a defined activity (e.g., a decanting activity that involves unloading products from containers and repackaging the products for shipment) over a series of consecutive time intervals. To generate the bar graph, for example, the aggregation platform 360 may aggregate perception metadata 376 that represents instances of workers performing the defined activity (e.g., as indicated by detected interactions between workers, containers, and products over time). Upon determining a count of activity occurrences for each time interval, for example, the corresponding visualization 620 may be generated.

Figure 6D:
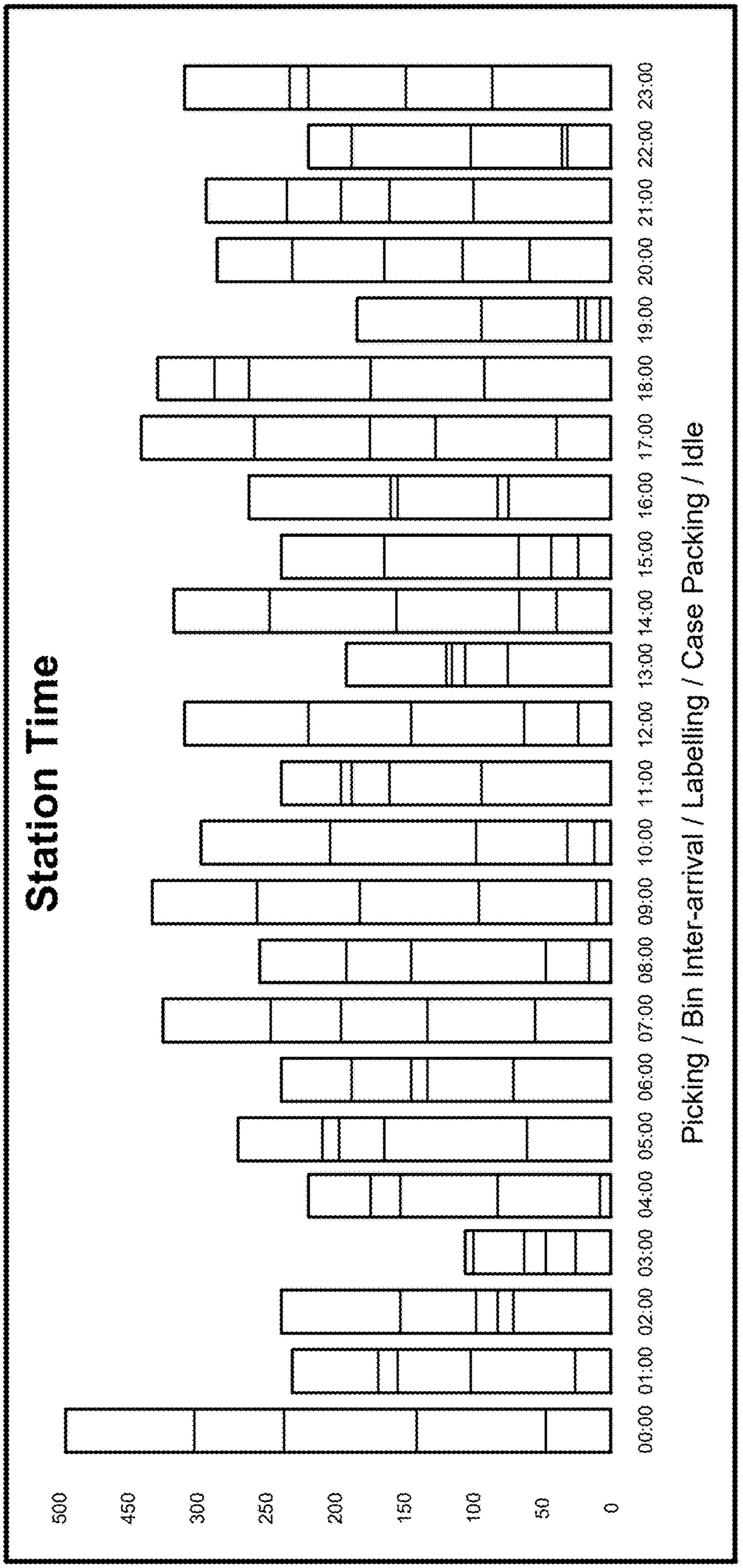

Referring now to FIG. 6D, example visualization 630 of aggregated perception metadata is shown. If the present example, the visualization 630 is a bar graph that plots percentages of time spent by workers in performing various defined activities (e.g., picking, bin inter-arrival, labelling, case packing, and idle) over a series of consecutive time intervals (e.g. one hour intervals). To generate the bar graph, for example, the aggregation platform 360 may aggregate perception metadata 376 that represents instances of workers performing the various defined activities (e.g., as indicated by detected interactions between workers, containers, and products over time). Upon determining a percentage of time spent by workers performing each of the various defined activities for each time interval, for example, the corresponding visualization 620 may be generated.

With respect to each of the example visualizations shown in FIGS. 6A-6D (and other possible visualizations of aggregated perception metadata), for example, various insights may be gleaned from the information conveyed in the visualizations, and optimizations of a structural environment may be performed based on the insights. In general, an optimization of the structural environment may involve physical and/or process reconfigurations of the environment. For example, upon analyzing the visualization 600 shown in FIG. 6A (e.g., the heat map that represents the movement of workers), the structural environment may be reconfigured to optimize paths between workstations. As another example, upon analyzing the visualization 610 shown in FIG. 6B (e.g., the bar graph that plots a queue time for a workstation or a piece of equipment), the structural environment may be reconfigured to increase a number of workstations/equipment, to decrease a number of workstations/equipment, or to provide service for maintaining one or more of the workstations/equipment. As another example, upon analyzing the visualization 620 shown in FIG. 6C (e.g., the bar graph that plots occurrences of a defined activity), the structural environment and/or a process flow within the structural environment may be optimized to increase efficiency of performance of the activity. As another example, upon analyzing the visualization 630 shown in FIG. 6D, resources (e.g., workers and/or equipment) may be reallocated within the structural environment at given times to optimize for the performance of particular tasks during those times. Many other sorts of optimizations of the structural environment and/or optimizations of processes performed within the structural environment may be achieved, based on an analysis of the generated visualizations of perception metadata.

Figure 7:
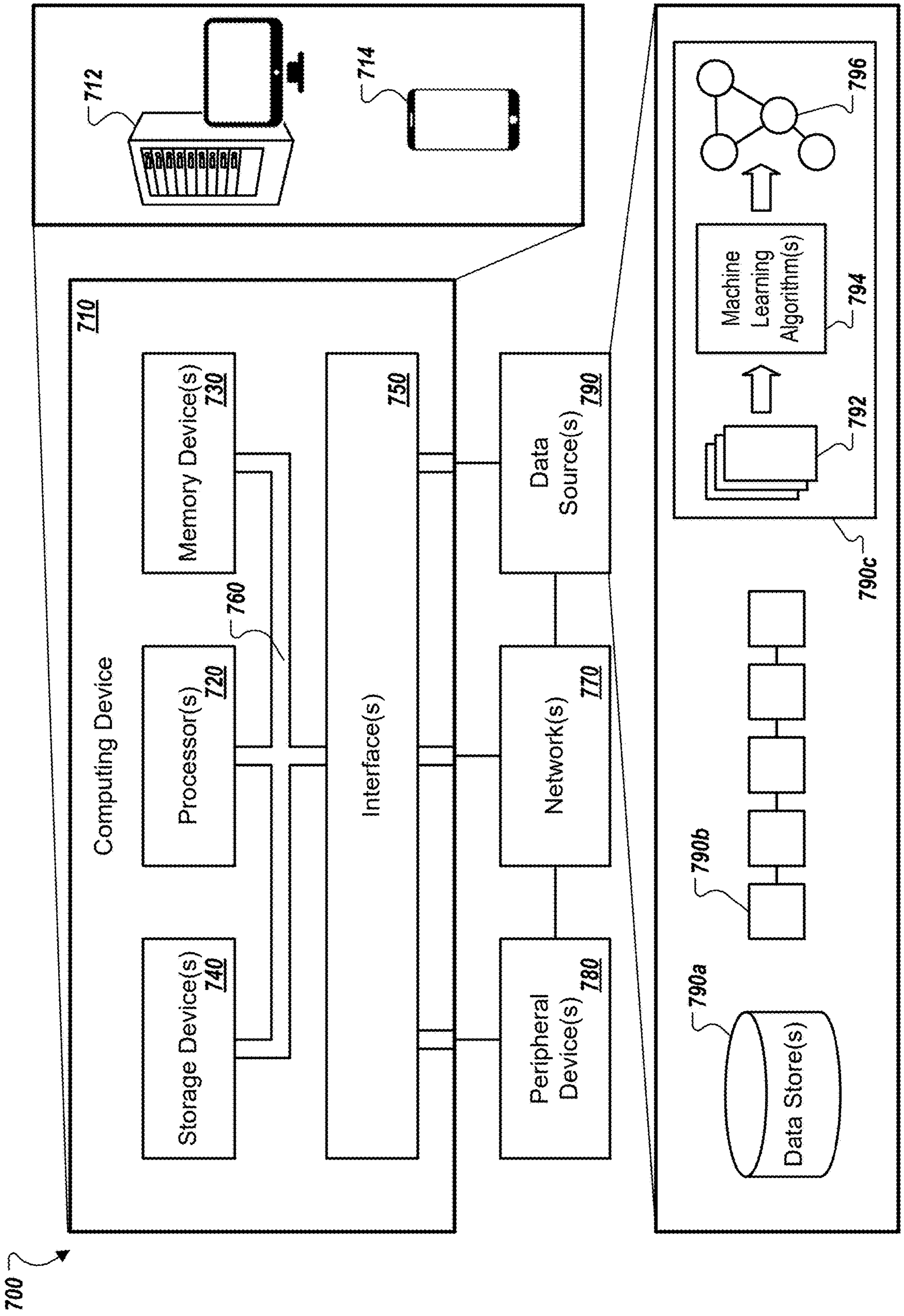
FIG. 7 is a schematic diagram that shows an example of a computing system.

FIG. 7 is a schematic diagram that shows an example of a computing system 700 that may be used to implement the techniques described herein. The computing system 700 includes one or more computing devices (e.g., computing device 710), which may be in wired and/or wireless communication with various peripheral device(s) 780, data source(s) 790, and/or other computing devices (e.g., over network(s) 770). The computing device 710 may represent various forms of stationary computers 712 (e.g., workstations, kiosks, servers, mainframes, edge computing devices, quantum computers, etc.) and mobile computers 714 (e.g., laptops, tablets, mobile phones, personal digital assistants, wearable devices, etc.). In some implementations, the computing device 710 may be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) may include components of the computing device 710, and an entire system may be made up of multiple devices communicating with each other. For example, the computing device 710 may be part of a computing system that includes a network of computing devices, such as a cloud-based computing system, a computing system in an internal network, or a computing system in another sort of shared network. Processors of the computing device (710) and other computing devices of a computing system may be optimized for different types of operations, secure computing tasks, etc. The components shown herein, and their functions, are meant to be examples, and are not meant to limit implementations of the technology described and/or claimed in this document.

The computing device 710 includes processor(s) 720, memory device(s) 730, storage device(s) 740, and interface (s) 750. Each of the processor(s) 720, the memory device(s) 730, the storage device(s) 740, and the interface(s) 750 are interconnected using a system bus 760. The processor(s) 720 are capable of processing instructions for execution within the computing device 710, and may include one or more single-threaded and/or multi-threaded processors. The processor(s) 720 are capable of processing instructions stored in the memory device(s) 730 and/or on the storage device(s) 740. The memory device(s) 730 may store data within the computing device 710, and may include one or more computer-readable media, volatile memory units, and/or non-volatile memory units. The storage device(s) 740 may provide mass storage for the computing device 710, may include various computer-readable media (e.g., a floppy disk device, a hard disk device, a tape device, an optical disk device, a flash memory or other similar solid state memory device, or an array of devices, including devices in a storage area network or other configurations), and may provide date security/encryption capabilities.

The interface(s) 750 may include various communications interfaces (e.g., USB, Near-Field Communication (NFC), Bluetooth, WiFi, Ethernet, wireless Ethernet, etc.) that may be coupled to the network(s) 770, peripheral device(s) 780, and/or data source(s) 790 (e.g., through a communications port, a network adapter, etc.). Communication may be provided under various modes or protocols for wired and/or wireless communication. Such communication may occur, for example, through a transceiver using a radio-frequency. As another example, communication may occur using light (e.g., laser, infrared, etc.) to transmit data. As another example, short-range communication may occur, such as using Bluetooth, WiFi, or other such transceiver. In addition, a GPS (Global Positioning System) receiver module may provide location-related wireless data, which may be used as appropriate by device applications. The interface (s) 750 may include a control interface that receives commands from an input device (e.g., operated by a user) and converts the commands for submission to the processors 720. The interface(s) 750 may include a display interface that includes circuitry for driving a display to present visual information to a user. The interface(s) 750 may include an audio codec which may receive sound signals (e.g., spoken information from a user) and convert it to usable digital data. The audio codec may likewise generate audible sound, such as through an audio speaker. Such sound may include real-time voice communications, recorded sound (e.g., voice messages, music files, etc.), and/or sound generated by device applications.

The network(s) 770 may include one or more wired and/or wireless communications networks, including various public and/or private networks. Examples of communication networks include a LAN (local area network), a WAN (wide area network), and/or the Internet. The communication networks may include a group of nodes (e.g., computing devices) that are configured to exchange data (e.g., analog messages, digital messages, etc.), through telecommunications links. The telecommunications links may use various techniques (e.g., circuit switching, message switching, packet switching, etc.) to send the data and other signals from an originating node to a destination node. In some implementations, the computing device 710 may communicate with the peripheral device(s) 780, the data source(s) 790, and/or other computing devices over the network(s) 770. In some implementations, the computing device 710 may directly communicate with the peripheral device(s) 780, the data source(s), and/or other computing devices.

The peripheral device(s) 780 may provide input/output operations for the computing device 710. Input devices (e.g., keyboards, pointing devices, touchscreens, microphones, cameras, scanners, sensors, etc.) may provide input to the computing device 710 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) may provide output from the computing device 710 (e.g., user-directed output and/or other output that results in actions being performed in a physical environment). Other kinds of devices may be used to provide for interactions between users and devices. For example, input from a user may be received in any form, including visual, auditory, or tactile input, and feedback provided to the user may be any form of sensory feedback (e.g., visual feedback, auditory feedback, or tactile feedback).

The data source(s) 790 may provide data for use by the computing device 710, and/or may maintain data that has been generated by the computing device 710 and/or other devices (e.g., data collected from sensor devices, data aggregated from various different data repositories, etc.). In some implementations, one or more data sources may be hosted by the computing device 710 (e.g., using the storage device(s) 740). In some implementations, one or more data sources may be hosted by a different computing device. Data may be provided by the data source(s) 790 in response to a request for data from the computing device 710 and/or may be provided without such a request. For example, a pull technology may be used in which the provision of data is driven by device requests, and/or a push technology may be used in which the provision of data occurs as the data becomes available (e.g., real-time data streaming and/or notifications) . Various sorts of data sources may be used to implement the techniques described herein, alone or in combination.

In some implementations, a data source may include one or more data store(s) 790*a* (e.g., databases, or other sorts of data management systems). The data store(s) may be provided by a single computing device or network (e.g., on a file system of a server device) or provided by multiple distributed computing devices or networks (e.g., hosted by a computer cluster, hosted in cloud storage, etc.). In some implementations, a database management system (DBMS) may be included to provide access to data contained in database(s) (e.g., through the use of a query language and/or application programming interfaces (APIs)). The database (s), for example, may include relational databases, object databases, structured document databases, unstructured document databases, graph databases, and other appropriate types of databases.

In some implementations, a data source may include one or more blockchains 790*b*. A blockchain may be a distributed ledger that includes blocks of records that are securely linked by cryptographic hashes. Each block of records includes a cryptographic hash of the previous block, and transaction data for transactions that occurred during a time period. The blockchain may be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain may maintain data quality (e.g., through data replication) and may improve data trust (e.g., by reducing or eliminating central data control).

In some implementations, a data source may include one or more machine learning systems 790*c*. The machine learning system(s) 790*c*, for example, may be used to analyze data from various sources (e.g., data provided by the computing device 710, data from the data store(s) 790*a*, data from the blockchain(s) 790*b*, and/or data from other data sources), to identify patterns in the data, and to draw inferences from the data patterns. In general, training data 792 may be provided to one or more machine learning algorithms 794, and the machine learning algorithm(s) may generate a machine learning model 796. Execution of the machine learning algorithm(s) may be performed by the computing device 710, or another appropriate device. Various machine learning approaches may be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques may be employed, including but not limited to convolutional neural networks (CNNs), deep neural networks (DNNs), recurrent neural networks (RNNs), and other types of multi-layer neural networks.

Various implementations of the systems and techniques described herein may be realized in digital electronic circuitry, integrated circuitry, specially designed ASICs (application specific integrated circuits), computer hardware, firmware, software, and/or combinations thereof. A computer program product may be tangibly embodied in an information carrier (e.g., in a machine-readable storage device), for execution by a programmable processor. Various computer operations (e.g., methods described in this document) may be performed by a programmable processor executing a program of instructions to perform functions of the described implementations by operating on input data and generating output. The described features may be implemented in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, by a computer to perform a certain activity or bring about a certain result. A computer program may be written in any form of programming language, including compiled or interpreted languages, and may be deployed in any form, including as a stand-alone program or as a module, component, subroutine, or other unit suitable for use in a computing environment. A computer program product may be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and may be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer may also include, or may be operatively coupled to communicate with, one or more mass storage devices for storing data files. Such devices may include magnetic disks (e.g., internal hard disks and/or removable disks), magneto-optical disks, and optical disks. Storage devices suitable for tangibly embodying computer program instructions and data may include all forms of non-volatile memory, including by way of example semiconductor memory devices, flash memory devices, magnetic disks (e.g., internal hard disks and removable disks), magneto-optical disks, and optical disks. The processor and the memory may be supplemented by, or incorporated in, ASICs (application-specific integrated circuits).

The systems and techniques described herein may be implemented in a computing system that includes a back end component (e.g., a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). The computer system may include clients and servers, which may be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments may also be implemented in combination in a single embodiment in part or in whole. Conversely, various features that are described in the context of a single embodiment may also be implemented in multiple embodiments separately or in any suitable subcombination. Moreover, although features may be described herein as acting in certain combinations and/or initially claimed as such, one or more features from a claimed combination may in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

The invention claimed is:

1. A method for generating and employing computer vision models of a structural environment, comprising:
- receiving real video of physical actions being performed in a physical space within the structural environment;
- receiving environment data that defines (i) physical dimensions of the physical space, and (ii) physical dimensions and operational characteristics of objects within the physical space;
- generating a virtual replica of the physical space and the objects within the physical space, based on the environment data;
- generating synthetic video that represents virtual actions being performed, using the virtual replica;
- training a computer vision model of the structural environment, based on the real video and the synthetic video;
- receiving a real video stream of subsequent actions being performed in the physical space within the structural environment;
- generating perception metadata that represents the subsequent actions being performed, by providing the real video stream to a perception pipeline that uses the computer vision model of the structural environment;
- aggregating at least a portion of the perception metadata; and
- generating a visualization of the aggregated perception metadata.

2. The method of claim 1, wherein the real video and the real video stream are received from real video cameras located in the structural environment.

3. The method of claim 1, wherein the objects within the physical space include actors that perform interactions with fixed or movable objects.

4. The method of claim 3, wherein generating the synthetic video comprises performing a computer simulation of the interactions with the fixed or movable objects performed by the actors.

5. The method of claim 1, wherein generating the synthetic video comprises capturing the synthetic video from a perspective of a virtual camera that is directed towards the virtual replica and the virtual actions being performed.

6. The method of claim 5, wherein the perspective of the virtual camera is from a virtual camera angle that corresponds to a real camera angle of a real video camera that captures the real video of physical actions being performed in the physical space.

7. The method of claim 5, wherein the perspective of the virtual camera is from a virtual camera angle that does not correspond to a real camera angle of a real video camera that captures the real video of physical actions being performed in the physical space.

8. The method of claim 1, wherein the synthetic video is automatically annotated with identifiers of at least some of the objects.

9. The method of claim 1, wherein the perception pipeline includes sequentially performed operations for processing the real video stream, the operations comprising at least one of (i) a decoding operation, (ii) a scaling operation, (iii) an object detection operation, (iv) an object tracking operation, (v) an object cropping operation, and (vi) a feature extraction operation.

10. The method of claim 1, wherein generating the perception metadata comprises identifying a plurality of objects represented in a video frame of the real video stream, and wherein the perception metadata comprises, for each object of the plurality of objects represented in the video frame of the real video stream, at least one of (i) an object identifier, (ii) a timestamp, and (iii) feature embeddings that result from a feature extraction operation performed on the object.

11. The method of claim 1, further comprising maintaining the perception metadata by a real-time data service; wherein aggregating at least a portion of the perception metadata comprises accessing the perception metadata from the real-time data service.

12. The method of claim 1, further comprising providing the visualization of the aggregated perception metadata for presentation by a dashboard application executed by a client computing device.

13. The method of claim 1, wherein aggregating at least a portion of the perception metadata comprises identifying the portion of the perception metadata that pertains to a specified period of time and counting instances of a defined action that are represented in the portion of the perception metadata over the specified period of time.

14. The method of claim 1, further comprising, based on the visualization of the aggregated perception metadata, performing a reconfiguration of the structural environment.

15. A system for generating and employing computer vision models of a structural environment, comprising:
- one or more data processing apparatuses including one or more processors, memory, and storage devices storing instructions that, when executed, cause the one or more processors to perform operations comprising:
  - receiving real video of physical actions being performed in a physical space within the structural environment;
  - receiving environment data that defines (i) physical dimensions of the physical space, and (ii) physical dimensions and operational characteristics of objects within the physical space;
  - generating a virtual replica of the physical space and the objects within the physical space, based on the environment data;
  - generating synthetic video that represents virtual actions being performed, using the virtual replica;
  - training a computer vision model of the structural environment, based on the real video and the synthetic video;
  - receiving a real video stream of subsequent actions being performed in the physical space within the structural environment;
  - generating perception metadata that represents the subsequent actions being performed, by providing the real video stream to a perception pipeline that uses the computer vision model of the structural environment;
  - aggregating at least a portion of the perception metadata; and
  - generating a visualization of the aggregated perception metadata.

16. The system of claim 15, wherein the real video and the real video stream are received from real video cameras located in the structural environment.

17. The system of claim 15, wherein the perception pipeline includes sequentially performed operations for processing the real video stream, the operations comprising at least one of (i) a decoding operation, (ii) a scaling operation, (iii) an object detection operation, (iv) an object tracking operation, (v) an object cropping operation, and (vi) a feature extraction operation.

18. The system of claim 15, wherein generating the perception metadata comprises identifying a plurality of objects represented in a video frame of the real video stream, and wherein the perception metadata comprises, for each object of the plurality of objects represented in the video frame of the real video stream, at least one of (i) an object identifier, (ii) a timestamp, and (iii) feature embeddings that result from a feature extraction operation performed on the object.

19. The system of claim 15, the operations further comprising maintaining the perception metadata by a real-time data service; wherein aggregating at least a portion of the perception metadata comprises accessing the perception metadata from the real-time data service.

20. The system of claim 15, the operations further comprising providing the visualization of the aggregated perception metadata for presentation by a dashboard application executed by a client computing device.

* * * * *